US010078470B2

(12) United States Patent
Suzuki

(10) Patent No.: US 10,078,470 B2
(45) Date of Patent: Sep. 18, 2018

(54) SIGNAL TRANSFER DEVICE THAT MAINTAINS ORDER OF A READ REQUEST AND WRITE REQUEST IN POSTED WRITE MEMORY ACCESS

(71) Applicant: Masahiro Suzuki, Tokyo (JP)

(72) Inventor: Masahiro Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 45 days.

(21) Appl. No.: 15/056,916

(22) Filed: Feb. 29, 2016

(65) Prior Publication Data

US 2016/0274820 A1    Sep. 22, 2016

(30) Foreign Application Priority Data

Mar. 19, 2015  (JP) ................................ 2015-056492

(51) Int. Cl.
*G06F 3/06*      (2006.01)
*G06F 13/16*     (2006.01)
*G06F 13/42*     (2006.01)

(52) U.S. Cl.
CPC .......... *G06F 3/0655* (2013.01); *G06F 3/061* (2013.01); *G06F 3/0604* (2013.01); *G06F 3/0629* (2013.01); *G06F 3/0673* (2013.01); *G06F 13/1668* (2013.01); *G06F 13/42* (2013.01)

(58) Field of Classification Search
CPC ...... G06F 3/0655; G06F 3/0604; G06F 3/061; G06F 3/0629; G06F 3/0673; G06F 13/1668; G06F 13/42; G06F 3/0659; G06F 13/1631; G06F 13/1663; G06F 13/1689; G06F 2212/7209
See application file for complete search history.

(56) References Cited

U.S. PATENT DOCUMENTS

| 5,214,642 | A | * | 5/1993 | Kunimoto | ............... G06F 5/065 370/471 |
| 5,584,040 | A | * | 12/1996 | Curt | ...................... G06F 3/0601 710/20 |
| 5,613,075 | A | * | 3/1997 | Wade | .................. G06F 13/1673 710/100 |
| 5,822,777 | A | * | 10/1998 | Leshem | .................. G06F 3/061 710/58 |
| 5,845,314 | A | * | 12/1998 | Ishida | ....................... G06F 5/10 711/104 |
| 5,917,839 | A | * | 6/1999 | Hashimoto | ......... H03M 13/098 714/718 |

(Continued)

FOREIGN PATENT DOCUMENTS

JP     2008-269078     11/2008

*Primary Examiner* — Mano Padmanabhan
*Assistant Examiner* — Andrew J Cheong
(74) *Attorney, Agent, or Firm* — Duft Bornsen & Fettig LLP

(57) ABSTRACT

A signal transfer device includes an interface and a read and write circuit. The interface has a posted write data protocol and transfers data to a memory control device that controls access to a shared memory. If a write request for writing data to the shared memory via the interface is issued, the read and write circuit acquires a write address from the write request, and puts a read request for reading data from the write address on standby until a transfer amount of write data exceeds a total size of buffers on a signal transfer path to the shared memory.

12 Claims, 13 Drawing Sheets

(56) References Cited

U.S. PATENT DOCUMENTS

| | | | | |
|---|---|---|---|---|
| 6,069,760 A * | 5/2000 | Yun | G11B 5/012 | 360/53 |
| 6,192,003 B1 * | 2/2001 | Ohta | G11C 8/18 | 365/230.01 |
| 6,567,094 B1 * | 5/2003 | Curry | G06F 5/065 | 345/542 |
| 6,681,314 B1 * | 1/2004 | Matsuo | G06F 13/4018 | 365/189.05 |
| 7,054,987 B1 * | 5/2006 | Reed | G06F 13/16 | 710/310 |
| 7,870,350 B1 * | 1/2011 | Yu | G06F 13/161 | 711/154 |
| 8,239,589 B1 * | 8/2012 | Certain | G06F 13/1626 | 710/39 |
| 2007/0245016 A1 * | 10/2007 | Li | H04L 49/25 | 709/224 |
| 2010/0250802 A1 * | 9/2010 | Waugh | G06F 13/4022 | 710/100 |
| 2011/0131476 A1 * | 6/2011 | Ariyama | G11B 20/10527 | 714/799 |
| 2017/0235497 A1 * | 8/2017 | Shih | G06F 3/0608 | 711/154 |

* cited by examiner

FIG. 4A

| No. | VALIDITY FLAG | WRITE ADDRESS | WRITE DATA SIZE | PASSED WRITE DATA COUNTER |
|---|---|---|---|---|
| 1 | 1 | A1 | S1 | C1 |
| 2 | 1 | A2 | S2 | C2 |
| 3 | 1 | A3 | S3 | C3 |
| 4 | 1 | A4 | S4 | C4 |
| 5 | 1 | A5 | S5 | C5 |
| 6 | 0 | INVALID | INVALID | INVALID |
| 7 | 0 | INVALID | INVALID | INVALID |
| 8 | 0 | INVALID | INVALID | INVALID |

FIG. 4B

| SIZE OF BUFFERS ON WRITE ACCESS PATH |
|---|
| B1 |

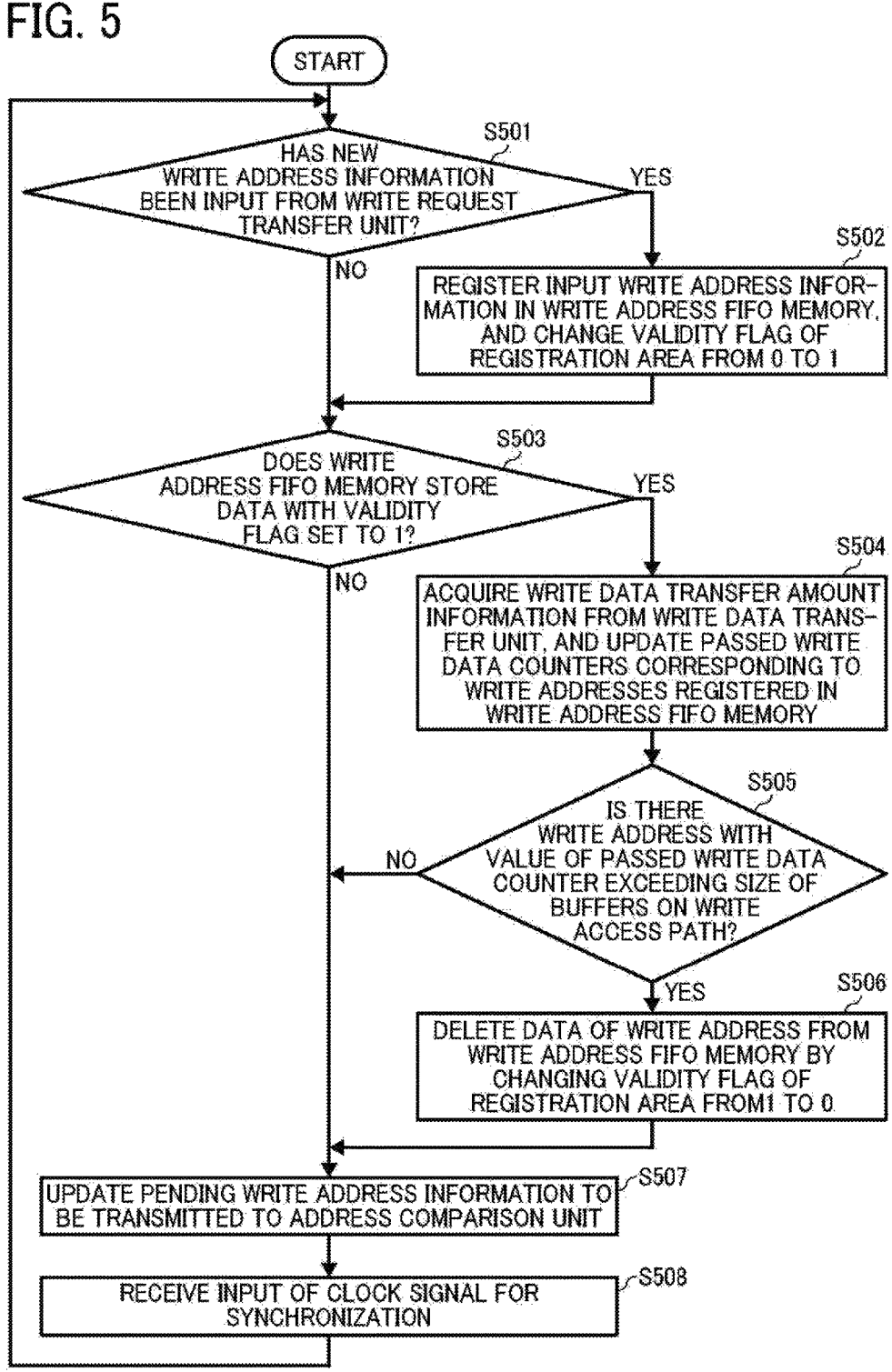

FIG. 11A

| No. | VALIDITY FLAG | WRITE ADDRESS | PASSED WRITE DATA COUNTER |
|---|---|---|---|
| 1 | 1 | A1 | C1 |
| 2 | 1 | A2 | C2 |
| 3 | 1 | A3 | C3 |
| 4 | 1 | A4 | C4 |
| 5 | 1 | A5 | C5 |
| 6 | 0 | INVALID | INVALID |
| 7 | 0 | INVALID | INVALID |
| 8 | 0 | INVALID | INVALID |

FIG. 11B

| SIZE OF BUFFERS ON WRITE ACCESS PATH |
|---|
| B1 |

FIG. 12A

| No. | VALIDITY FLAG | WRITE ADDRESS |
|---|---|---|
| 1 | 1 | A1 |
| 2 | 1 | A2 |
| 3 | 1 | A3 |
| 4 | 1 | A4 |
| 5 | 1 | A5 |
| 6 | 0 | INVALID |
| 7 | 0 | INVALID |
| 8 | 0 | INVALID |

FIG. 12B

| SIZE OF BUFFERS ON WRITE ACCESS PATH |
|---|
| B1 |

SIGNAL TRANSFER DEVICE THAT MAINTAINS ORDER OF A READ REQUEST AND WRITE REQUEST IN POSTED WRITE MEMORY ACCESS

CROSS-REFERENCE TO RELATED APPLICATION

This patent application is based on and claims priority pursuant to 35 U.S.C. § 119(a) to Japanese Patent Application No. 2015-056492 filed on Mar. 19, 2015, in the Japan Patent Office, the entire disclosure of which is hereby incorporated by reference herein.

BACKGROUND

Technical Field

This disclosure relates to a signal transfer device, an information processing apparatus, a signal transfer method, and a non-transitory recording medium.

Related Art

In data transfer between multiple devices, such as a master device and a slave device, for example, one of the devices transmits a write request and a read request to the other device.

In a protocol that transfers the read request and the write request on the same signal line, such as the open core protocol (OCP) standard, for example, the read request and the write request output from the same master device reach the slave device with the temporal order of the read request and the write request maintained.

SUMMARY

In one embodiment of this disclosure, there is provided an improved signal transfer device that includes, for example, an interface and a read/write (read and write) circuit. The interface has a posted write data protocol and transfers data to a memory control device that controls access to a shared memory. If a write request for writing data to the shared memory via the interface is issued, the read/write circuit acquires a write address from the write request, and puts a read request for reading data from the write address on standby until a transfer amount of write data exceeds a total size of buffers on a signal transfer path to the shared memory.

In one embodiment of this disclosure, there is provided an improved information processing apparatus that includes, for example, a memory control device to control access to a shared memory and the above-described signal transfer device.

In one embodiment of this disclosure, there is provided an improved signal transfer method including, for example, transferring data to a memory control device via an interface having a posted write data protocol, the memory control device controlling access to a shared memory, issuing a write request for writing data to the shared memory via the interface, acquiring a write address from the issued write request, issuing a read request for reading data from the write address, and putting the read request on standby until a transfer amount of write data exceeds a total size of buffers on a signal transfer path to the shared memory.

In one embodiment of this disclosure, there is provided a non-transitory recording medium storing a program for causing a computer to execute the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are diagrams illustrating data registered in a write address FIFO memory mounted in a write address management unit in the standby unit;

FIG. 5 is a flowchart illustrating an operation of the write address management unit;

FIGS. 11A and 11B are diagrams illustrating a configuration of data stored in the write address FIFO memory mounted in the write address management unit according to a fifth embodiment of this disclosure;

FIGS. 12A and 12B are diagrams illustrating a configuration of data stored in the write address FIFO memory mounted in the write address management unit according to a sixth embodiment of this disclosure.

Figure 1:
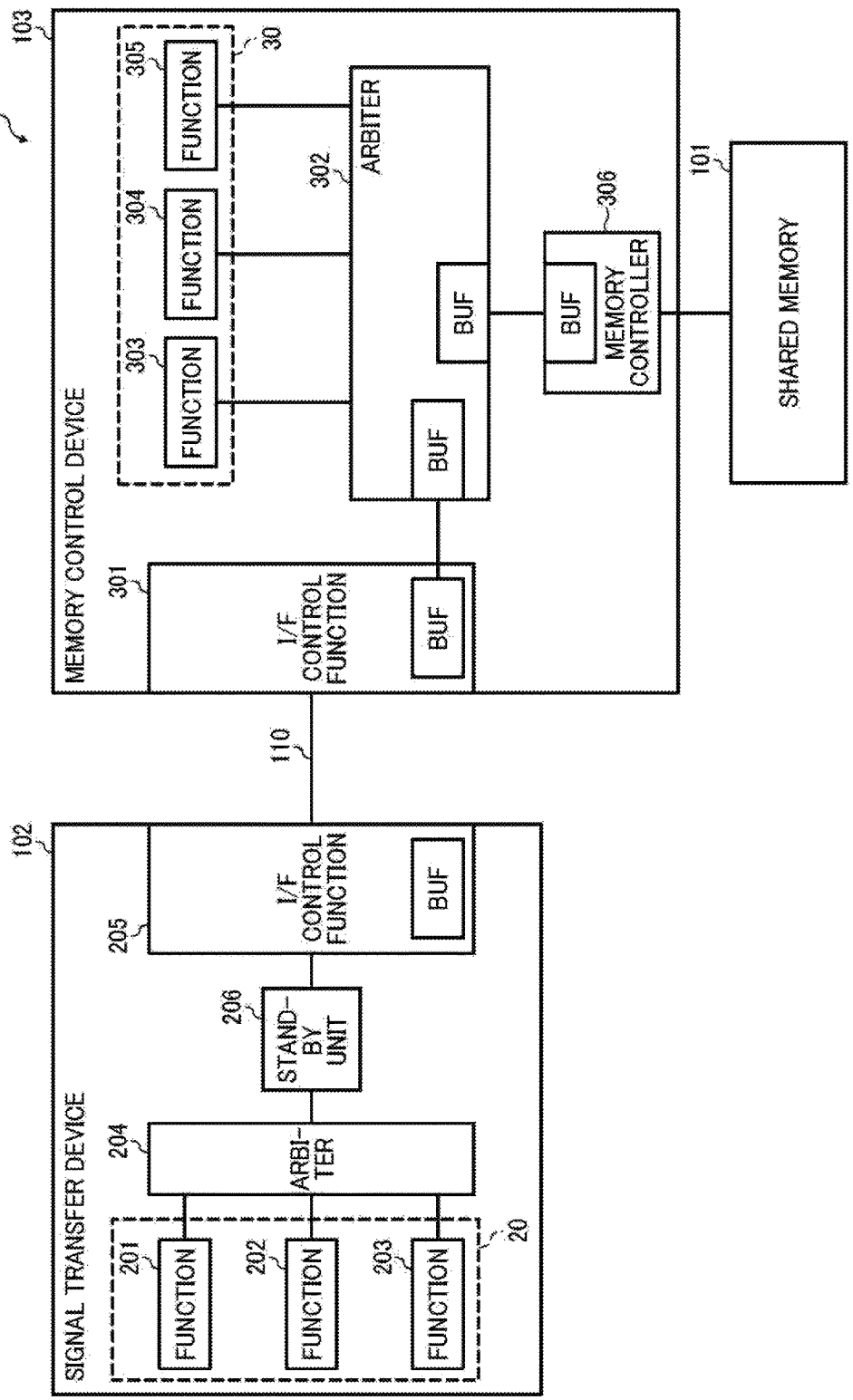
FIG. 1 is a diagram illustrating an exemplary configuration of an information processing apparatus including a signal transfer device according to a first embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, a signal transfer device according to an embodiment of this disclosure will be described.

In a protocol that transfers a read request and a write request on different signal lines, such as the advanced extensible interface (AXI) standard, for example, the temporal order of the read request and the write request output from the same master device may be reversed depending on standby time caused by buffers on a path, arbitration with a read or write request output from another master device, and so forth. If a read request transmitted to a given address overtakes a write request previously transmitted to the same address, data before being rewritten by the overtaken write request is read. Consequently, the master device having issued the read request receives unintended incorrect data.

As a mechanism addressing this issue to maintain the temporal order of the read request and the write request, written standards of AXI interface (I/F) describe a method of causing the master device to issue the read request after receiving write response to the write request (hereinafter referred to as the first method).

Further, to address a posted write request for which no write response is returned, there is a method of outputting a dummy read command to a memory device after issuing the write request to the memory device, and then issuing the read request after receiving response to the dummy read command, i.e., after the write request is written to the memory (hereinafter referred to as the second method).

According to the first method, in memory access through at least one "device having no control mechanism for maintaining the temporal order of the read request and the write request" via an I/F having a posted write transfer protocol that does not return the write response, the temporal order of the read request and the write request is maintained in the master device. The method, however, fails to prevent the read request from overtaking the write request in the "device having no control mechanism for maintaining the temporal order of the read request and the write request."

The second method also fails to prevent the read request from overtaking the write request in the "device having no control mechanism for maintaining the temporal order of the read request and the write request" in the posted write system.

A signal transfer device according to an embodiment of this disclosure maintains the temporal order of the read request and the write request in posted write memory access via a data path having no control mechanism for maintaining the temporal order of the read request and the write request.

A first embodiment of this disclosure will now be described.

FIG. 1 is a diagram illustrating an exemplary configuration of an information processing apparatus 1000 including a signal transfer device 102 according to the first embodiment. As illustrated in FIG. 1, the information processing apparatus 1000 includes a shared memory 101, a memory control device 103, and the signal transfer device 102. The memory control device 103, which includes an I/F control function 301, an arbiter 302, functions 303, 304, and 305, and a memory controller 306, controls access to the shared memory 101. The signal transfer device 102 includes functions 201, 202, and 203 serving as masters that request memory access to the shared memory 101, an arbiter 204, an I/F control function 205, and a read request standby unit 206 (hereinafter simply referred to as the standby unit 206). In the present embodiment, the memory control device 103 is a "device having no control mechanism for maintaining the temporal order of the read request and the write request." An I/F 110 having a posted write protocol transfers the write request between the signal transfer device 102 and the memory control device 103. According to the I/F 110, a write command is posted.

The arbiter 302 is an internal bus of the memory control device 103. The arbiter 302 may use a protocol that transfers the read request and the write request on different signal lines, such as the AXI I/F. In this case, if the write request and the read request are successively issued to the same address from the function 201 (i.e., master) of the signal transfer device 102, for example, the read request may overtake the write request, unless a mechanism for passing the read request after receiving write response to the previously issued write request is mounted on a master side of the arbiter 302 or a memory side of the I/F control function 301 serving as a start point of the AXI I/F.

As the memory control device 103 is such a "device having no control mechanism for maintaining the temporal order of the read request and the write request" and the I/F 110 for transferring the write request to the memory control device 103 has the posted write protocol, the signal transfer device 102 includes the standby unit 206 to prevent the read request from overtaking the write request when the read request and the write request are transmitted to the same address. The standby unit 206 is implemented by a read/write circuit, for example.

The standby unit 206 has a function of monitoring access addresses to the shared memory 101, and if a read request is issued to an address to which a write request has previously been issued, putting the read request on standby until an amount of data corresponding to the size of data buffers subsequent to the standby unit 206 is written.

As illustrated in FIG. 1, in the present embodiment, the standby unit 206 performs a control to issue the read request after the passage of an amount of write data corresponding to the total size of buffers (denoted as BUF in FIG. 1) in the I/F control function 205 of the signal transfer device 102 and the I/F control function 301, the arbiter 302, and the memory controller 306 of the memory control device 103.

The arbiter 302 illustrated in FIG. 1 includes two buffers, for example, like a typical arbiter having a buffer for each of a master port and a slave port.

The signal transfer device 102 thus waits for the passage of the amount of write data corresponding to the total size of the buffers present on the path from the standby unit 206 to the shared memory 101. Accordingly, the previously issued write request is reliably written to the shared memory 101, i.e., prevented from being overtaken by the read request issued later to the address to which the write request has been issued.

The shared memory 101 is a main memory for temporarily storing images and programs for a first central processing unit (CPU) 20 and a second CPU 30 provided in the signal transfer device 102 and the memory control device 103, respectively. Data processed by the functions 201 to 203 and the functions 303 to 305 is deployed in the shared memory 101.

For example, the first CPU 20 executes various functions of the signal transfer device 102 (the functions 201 to 203 in this case) in accordance with programs read from the shared memory 101 and acquired via the memory control device 103. The second CPU 30 similarly executes various functions of the memory control device 103 (the functions 303 to 305 in this case) in accordance with programs read from the shared memory 101. Each of the first CPU 20 and the second CPU 30 is not required to be one processor, and may be a plurality of processors. Further, each of the first CPU 20 and the second CPU 30 may be an application specific integrated circuit (ASIC) prepared specifically for implementing the corresponding functions.

The signal transfer device 102 includes at least one function that performs, as a master, memory access to the shared memory 101, such as the function 201. The signal transfer device 102 accesses the shared memory 101 via at least one "device having no control mechanism for maintaining the temporal order of the read request and the write request." The signal transfer device 102 further includes the I/F control function 205 that issues the posted write request on an access path to the shared memory 101.

The functions 202 and 203, the arbiter 204, and the functions 303 to 305 in the exemplary configuration illustrated in FIG. 1 are optional components of this disclosure.

In the memory control device 103, the I/F control function 301 passes the read request and the write request from the signal transfer device 102 to the shared memory 101, and the memory controller 306 connects the memory control device 103 to the shared memory 101. The memory control device 103 accesses the shared memory 101 without control by a unit such as the arbiter 302 to maintain the temporal order of the read request and the write request received from the signal transfer device 102.

To prevent the read request from overtaking the write request to maintain the temporal order of the read request and the write request, the above-described configuration normally employs a method of issuing the write or read request after receiving the read or write response when the arbiter 302 adopts a protocol that transfers the read request and the write request on different signal lines, such as the AXI, or a method of issuing the write or read request without waiting for the read or write response, but monitoring the addresses of the write request and the read request, and if a new access request is issued to an address before the response to an access request issued previously to the address is returned, starting the next access after receiving the response to the previously issued access request.

Figure 2:
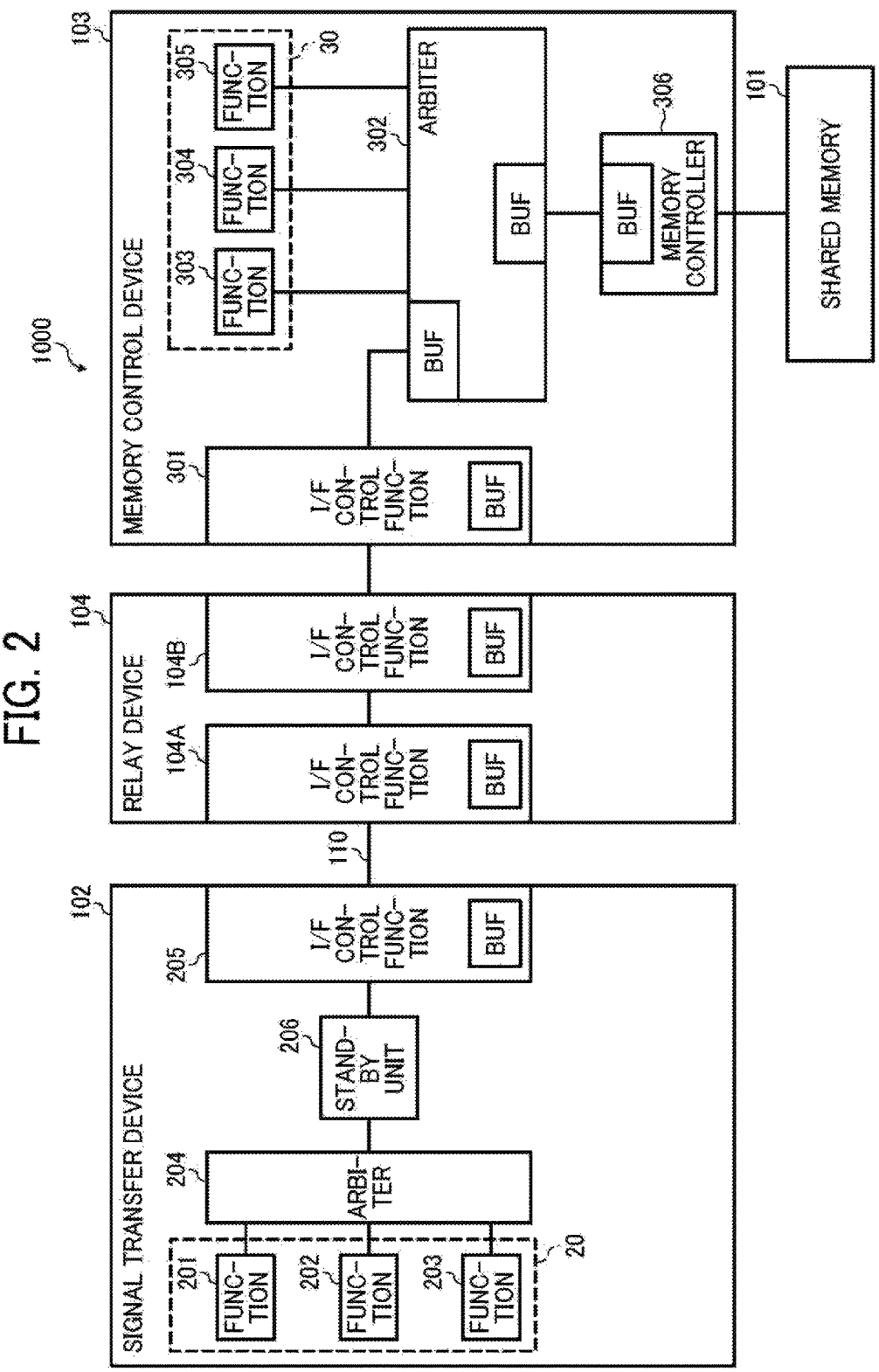
FIG. 2 is a diagram illustrating another exemplary configuration of the information processing apparatus.

FIG. 2 is a diagram illustrating another exemplary configuration of the information processing apparatus 1000. In the foregoing exemplary configuration in FIG. 1, the memory control device 103 including the memory controller 306 is a "device having no control mechanism for maintaining the temporal order of the read request and the write request." Alternatively, the information processing apparatus 1000 may include a relay device 104 as a "device having no control mechanism for maintaining the temporal order of the read request and the write request" on the path from the signal transfer device 102, which serves as a master that accesses the shared memory 101, to the shared memory 101. In the exemplary configuration of the information processing apparatus 1000 in FIG. 2, the standby unit 206 puts the read request on standby until a transfer amount of write data exceeds the total size of buffers for write data in I/F control functions 104A and 104B of the relay device 104.

Figure 3:
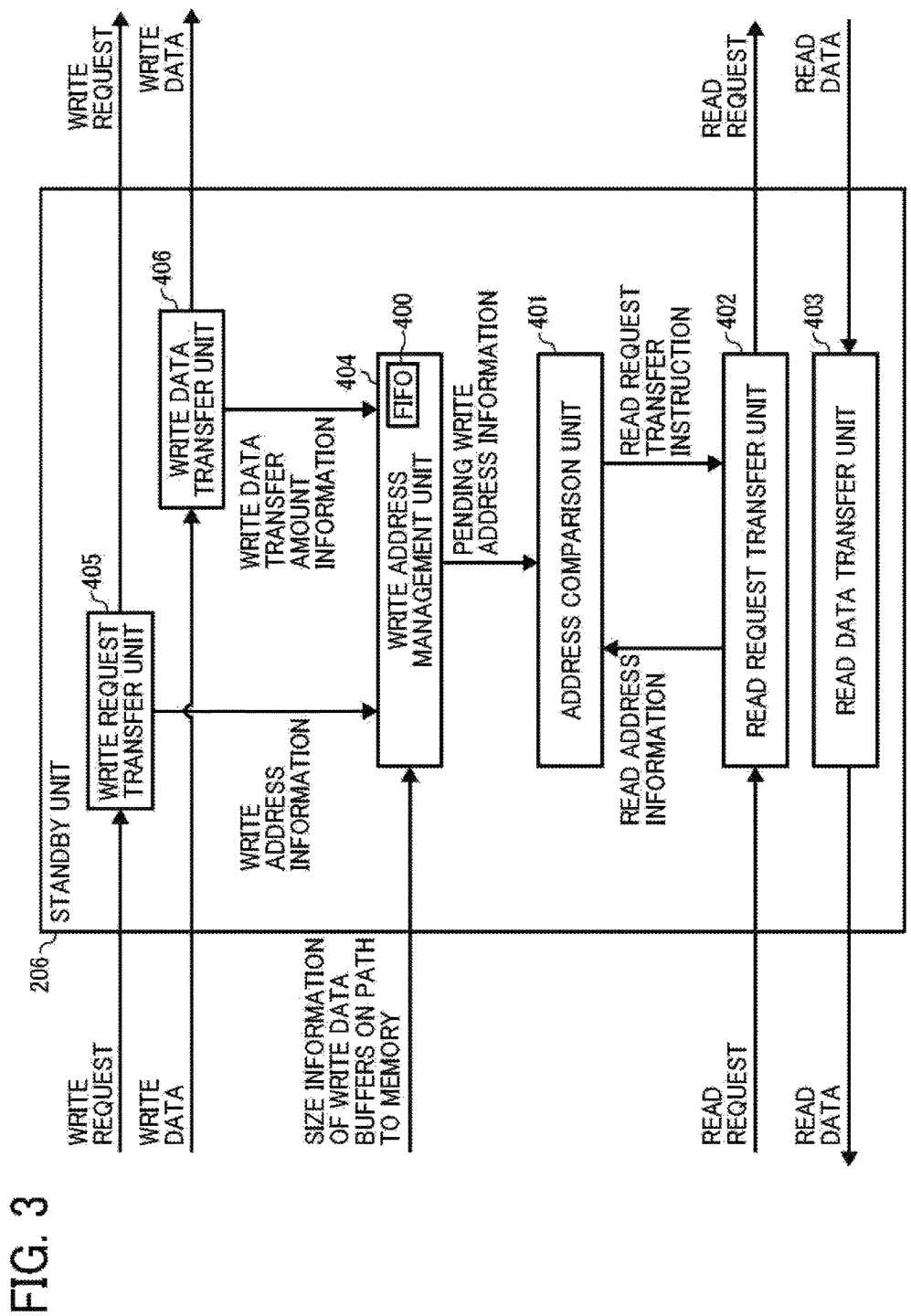
FIG. 3 is a diagram illustrating a configuration of a standby unit in the signal transfer device according to the first embodiment.

FIG. 3 is a diagram illustrating a configuration of the standby unit 206 according to the first embodiment. As illustrated in FIG. 3, the standby unit 206 latches the address of the write request output from the signal transfer device 102 and compares the address of the write request with the address of the read request. Then, if the read request is output to the address to which the write request has previously been output, the standby unit 206 puts the read request on standby. The read request thus put on standby is output after write data corresponding to the total size of the buffers for write data present on the path from the standby unit 206 to the shared memory 101 is output from the signal transfer device 102 after the output of the write request.

The standby unit 206 includes an address comparison unit 401, a read request transfer unit 402, a read data transfer unit 403, a write address management unit 404, a write request transfer unit 405, and a write data transfer unit 406. These components included in the standby unit 206 are implemented by circuits and instructions from the CPU 20.

The address comparison unit 401 compares pending write address information transmitted from the write address management unit 404 with the address of the read request to be transferred by the read request transfer unit 402, and determines whether or not the pending write address information includes the address of the read request. If the pending write address information does not include the address of the read request, the address comparison unit 401 transmits a read request transfer instruction to the read request transfer unit 402. If the pending write address information includes the address of the read request, the address comparison unit 401 transmits the read request transfer instruction to the read request transfer unit 402 after the access of the corresponding write request is completed and address information corresponding to the write request is deleted from the pending write address information transmitted from the write address management unit 404.

Herein, the pending write address information refers to the information of the write address of at least one write request for write data not confirmed to have been written to the shared memory 101, and includes the write address and the write data size of the write request. In the posted write system, the response indicating the completion of data writing is not returned. In this case, therefore, the completion of data writing to the shared memory 101 is determined based on whether or not write data having at least the size of the buffers for write data on the path has been passed. Alternatively, the completion of data writing to the shared memory 101 may be determined based on the passage of the write request through the relay device 104 illustrated in FIG.

2, i.e., a "device having no control mechanism for maintaining the temporal order of the read request and the write request."

The read request transfer unit 402 receives the read request and transmits read address information to the address comparison unit 401. Then, the read request transfer unit 402 receives the read request transfer instruction from the address comparison unit 401 and transfers the read request to the I/F control function 205.

The read data transfer unit 403 receives and transfers read data from the I/F control function 205 to the arbiter 204. The read data transfer unit 403 in this exemplary embodiment is an optional component of this disclosure.

The write address management unit 404 receives write address information of the write request from the write request transfer unit 405, and latches the write address information in a write address first-in, first-out (FIFO) memory 400 provided in the write address management unit 404. The write address management unit 404 transmits the address registered in the write address FIFO memory 400 to the address comparison unit 401 as the pending write address information.

The write address management unit 404 further receives write data transfer amount information from the write data transfer unit 406, counts, for each of write requests registered in the write address FIFO memory 400, the size of write data passed after the output of the write request, and compares the size of passed write data with the total size of the buffers for write data present on the path from the standby unit 206 to the shared memory 101. Then, if the size of passed write data exceeds the size of the buffers for write data present on the path from the standby unit 206 to the shared memory 101, the write address management unit 404 determines the completion of write access and deletes the corresponding address from the write address FIFO memory 400. The write address management unit 404 also deletes, from the pending write address information to be transmitted to the address comparison unit 401, the address deleted from the write address FIFO memory 400.

The write request transfer unit 405 receives and transfers the write request from the arbiter 204 to the I/F control function 205 and transmits the corresponding write address information to the write address management unit 404.

The write data transfer unit 406 receives and transfers write data from the arbiter 204 to the I/F control function 205 and transmits the corresponding write data transfer amount information to the write address management unit 404.

The size of the buffers for write data present on the path from the standby unit 206 to the shared memory 101 depends on the system configuration. To make the signal transfer device 102 applicable to multiple systems, the write data transfer amount (i.e., transferred write data amount) used for comparison by the write address management unit 404 may be changed for each of the systems by register setting, for example.

If the present disclosure is applied to a split-transaction I/F that transfers the write request and the write data asynchronously, the write address management unit 404 manages the write address information transmitted from the write request transfer unit 405 and the write data transfer amount information transmitted from the write data transfer unit 406 by linking the write address information and the write data transfer amount information to each other, and counts the amount of write data passed after the transfer of the write data corresponding to the write request registered in the write address FIFO memory 400.

FIGS. 4A and 4B are diagrams illustrating data registered in the write address FIFO memory 400 mounted in the write address management unit 404. FIG. 4A illustrates data registered in the write address FIFO memory 400. FIG. 4B illustrates the size of the buffers on the write access path stored separately from the data of FIG. 4A.

As illustrated in FIG. 4A, the write address FIFO memory 400 stores the values of a validity flag, a write address, a write data size, and a passed write data counter in a first-in, first-out fashion. The validity flag indicates whether or not the registered data is valid. The write address represents a write destination address. The write data size represents the size of the write data. The passed write data counter indicates the amount of data passed through the standby unit 206. The write address FIFO memory 400 stores eight records (i.e., data items), for example.

In each transfer of the write request, the write address management unit 404 registers in the write address FIFO memory 400 the write address and the corresponding write data size notified by the write request transfer unit 405, and sets the validity flag to 1 to indicate that the registered write address is valid.

The write address management unit 404 further counts, for each of the registered write requests, the size of the write data passed after the transfer of the write request based on the write data transfer amount information transmitted from the write data transfer unit 406. If the value of the passed write data counter exceeds the value of the size of the buffers on the write access path, the write address management unit 404 deletes the corresponding address data from the write address FIFO memory 400 and also from the pending write address information to be transmitted to the address comparison unit 401.

FIG. 5 is a flowchart illustrating an operation of the write address management unit 404. As illustrated in FIG. 5, at step S501, the write address management unit 404 determines whether or not new write address information has been input from the write request transfer unit 405.

The write request transfer unit 405 transmits the write address information to the write address management unit 404 each time the write request is input to the write request transfer unit 405.

If the write address information is transmitted to the write address management unit 404 (YES at step S501), the write address management unit 404 proceeds to step S502 to register the write address information in the write address FIFO memory 400. If there is no write address information transmitted to the write address management unit 404 (NO at step S501), the write address management unit 404 proceeds to step S503 to update the passed write data counters corresponding to the write addresses of the write requests already registered in the write address FIFO memory 400.

At step S502, the write address management unit 404 registers the new write address information in an area of the write address FIFO memory 400 with the validity flag set to 0, and changes the value of the validity flag for the data to 1.

At step S503, the write address management unit 404 determines whether or not the write address FIFO memory 400 stores any data with the validity flag set to 1.

The presence of write address data with the validity flag set to 1 in the write address FIFO memory 400 indicates that there is a write request for write data not confirmed to have been written to the shared memory 101 after posted write of the write request to the memory control device 103.

If the write address FIFO memory 400 stores any write address data with the validity flag set to 1 (YES at step S503), the write address management unit 404 proceeds to step S504 to update the corresponding passed write data counter. If not (NO at step S503), the write address management unit 404 proceeds to step S507.

The passed write data counter is not updated unless there is transfer of write data following the issuance of a new write request. Once a write address is registered in the write address FIFO memory 400 a state does not occur in which all validity flags in the write address FIFO memory 400 have the value 0. In the first embodiment, therefore, step S504 is unnecessary, and thus may be omitted to allow the write address management unit 404 to proceed to step S505 from step S503. All validity flags have the value 0 when dummy write is performed, since the passed write data counter is updated without registration of a new write address in this case. Therefore, step S504 may be executed in this case.

At step S504, the write address management unit 404 acquires the write data transfer amount information from the write data transfer unit 406, and updates the passed write data counters corresponding to the write addresses registered in the write address FIFO memory 400. The write address management unit 404 acquires a newly transferred write data amount from the write data transfer amount information received from the write data transfer unit 406, and adds the write data amount to the corresponding passed write data counter in the write address FIFO memory 400.

At step S505, the write address management unit 404 determines whether or not any of the write addresses of the write requests registered in the write address FIFO memory 400 has the value of the passed write data counter exceeding the size of the write data buffers on the write access path. If there is such a write address (YES at step S505), the write address management unit 404 proceeds to step S506. If not (NO at step S505), the write address management unit 404 proceeds to step S507.

At step S506, the write address management unit 404 deletes from the write address FIFO memory 400 the data of the write address with the value of the passed write data counter exceeding the size of the write data buffers on the write access path. Specifically, the write address management unit 404 changes the value of the validity flag for the data of the write address in the registration area of the write address FIFO memory 400 from 1 to 0.

The passage of write data exceeding the size of the write data buffers on the write access path indicates that the write data corresponding to the write request has been written to the shared memory 101. The value of the validity flag is therefore changed to 0 for the write address of the write request for the write data confirmed to have been written to the shared memory 101, to thereby delete the data of the write address from the write address FIFO memory 400.

At step S507, the write address management unit 404 updates the pending write address information to be transmitted to the address comparison unit 401.

The write address management unit 404 updates the pending write address information, which represents the write address of at least one write request for write data not confirmed to have been written to the shared memory 101, based on the information of the validity flag changed at steps S502 and S506. The write address management unit 404 then transmits the updated pending write address information to the address comparison unit 401.

At step S508, the write address management unit 404 waits for input of a clock signal serving as a synchronization signal, and returns to step S501 upon receipt of the clock signal.

Figure 6:
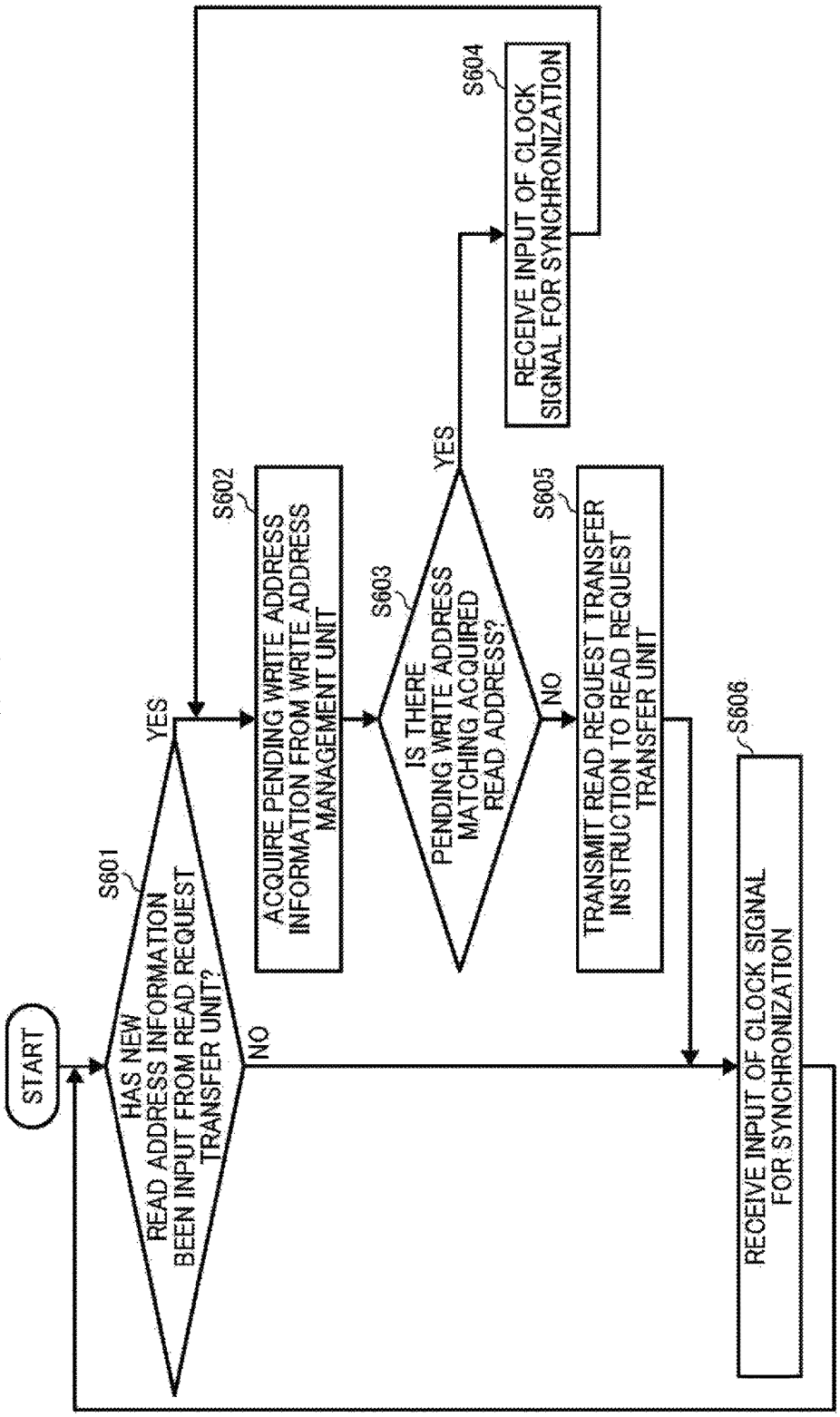
FIG. 6 is a flowchart illustrating an operation of an address comparison unit in the standby unit.

FIG. 6 is a flowchart illustrating an operation of the address comparison unit 401. As illustrated in FIG. 6, at step S601, the address comparison unit 401 determines whether or not new read address information has been input from the read request transfer unit 402.

The read request transfer unit 402 transmits the read address information to the address comparison unit 401 each time the read request is input to the read request transfer unit 402. If the read address information is transmitted to the address comparison unit 401 (YES at step S601), the address comparison unit 401 proceeds to step S602 to determine whether or not to transfer the corresponding read request.

At step S602, the address comparison unit 401 acquires from the write address management unit 404 the pending write address information, which represents the write address of at least one write request for write data not confirmed to have been written to the shared memory 101, to compare the write address with the read address.

At step S603, the address comparison unit 401 determines whether or not there is any pending write address that matches the read address acquired at step S601. The address comparison unit 401 compares the read address acquired at step S601 with the write address of the at least one write request for write data not confirmed to have been written to the shared memory 101 acquired at step S602.

If there is any write address matching the read address (YES at step S603), the address comparison unit 401 proceeds to step S604 to wait for the write address to be deleted from the pending write address information. If there is no write address matching the read address (NO at step S603), the address comparison unit 401 proceeds to step S605.

At step S604, the address comparison unit 401 waits for input of a clock signal serving as a synchronization signal, and returns to step S602 upon receipt of the clock signal to check if the write address matching the read address has been deleted.

At step S605, the address comparison unit 401 transmits the read request transfer instruction to the read request transfer unit 402 upon confirmation at step S603 that the write request to the same address as the address of the read address is not left in the memory control device 103, which is a "device having no control mechanism for maintaining the temporal order of the read request and the write request."

At step S606, the address comparison unit 401 waits for input of a clock signal serving as a synchronization signal, and returns to step S601 upon receipt of the clock signal.

As described above, the signal transfer device 102 according to the present embodiment includes the standby unit 206 that acquires the write address from each write request issued to the shared memory 101 and suspends data reading from the write address until the transfer amount of write data exceeds the total size of the buffers on the signal transfer path.

Accordingly, the signal transfer device 102 according to the present embodiment maintains the temporal order of the read request and the write request in posted write memory access via a data path having no control mechanism for maintaining the temporal order of the read request and the write request.

A second embodiment of this disclosure will now be described.

The second embodiment is similar in configuration to the first embodiment except for the configuration and operation of a standby unit 206B. The following description will therefore focus on differences of the second embodiment from the first embodiment.

Figure 7:
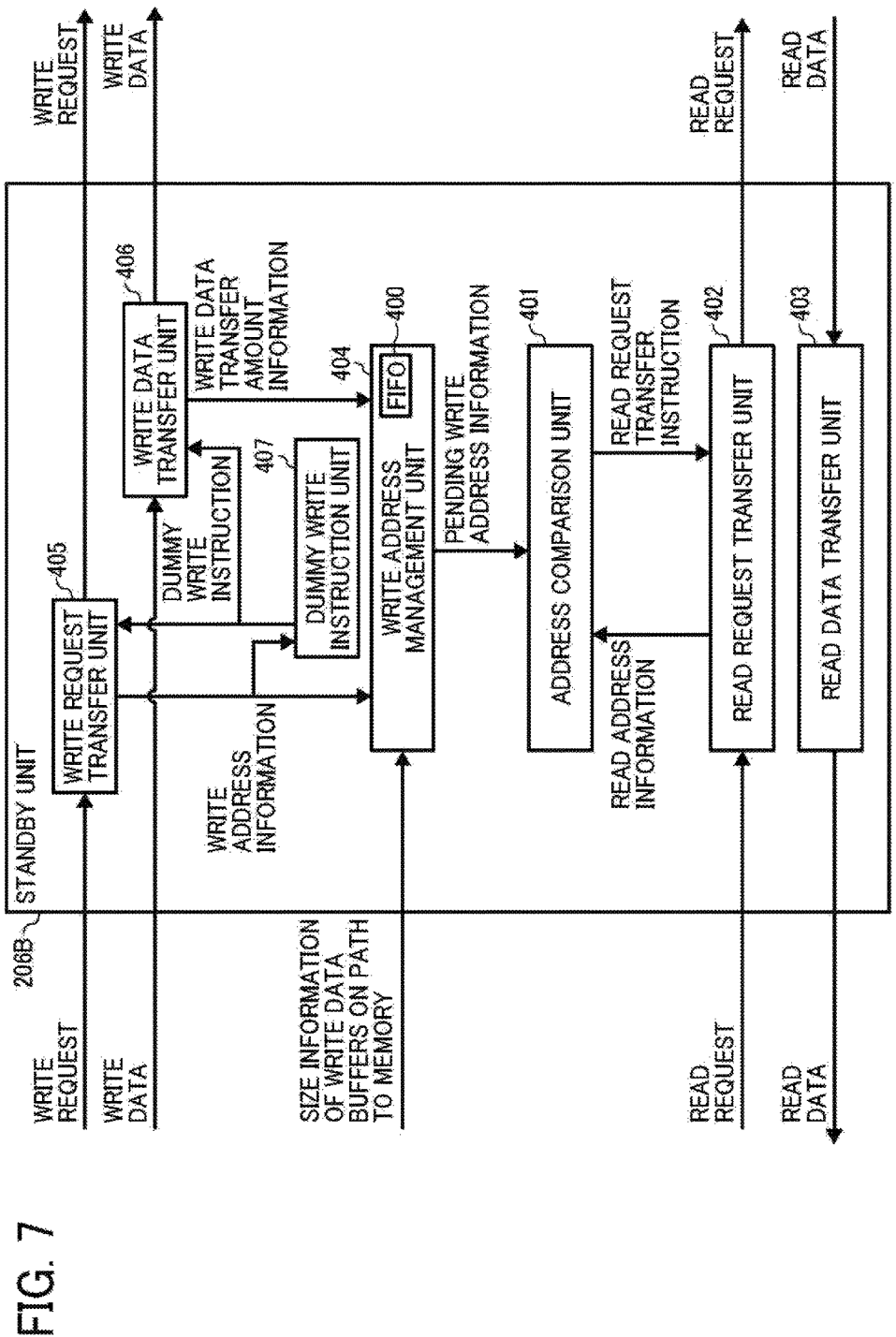
FIG. 7 is a diagram illustrating a configuration of a standby unit according to a second embodiment of this disclosure.

FIG. 7 is a diagram illustrating a configuration of the standby unit 206B according to the second embodiment. As illustrated in FIG. 7, the standby unit 206B according to the second embodiment is similar in configuration to the standby unit 206 according to the first embodiment except for an additionally provided dummy write instruction unit 407.

The standby unit 206B sends the write request transfer unit 405 and the write data transfer unit 406 a dummy write instruction to perform dummy write if the transfer interval of the write request exceeds a predetermined time.

The write request transfer unit 405 and the write data transfer unit 406 have a function of generating and outputting a write request and write data to the I/F control function 205 in response to the dummy write instruction received from the dummy write instruction unit 407, without receiving the write request (i.e., write command) and write data from the arbiter 204.

With the dummy write, the write data transfer amount information transmitted to the write address management unit 404 from the write data transfer unit 406 is updated, allowing the read request put on standby to be output within a predetermined time, even if the transfer interval of the write request from the arbiter 204 is increased. This configuration minimizes degradation of reading performance due to a delay in writing to the same address as that of the read request.

It is desirable to specify an address in the shared memory 101 as a dummy write destination address. In this case, the information processing apparatus 1000 allocates a dummy write area in the shared memory 101.

Figure 8:
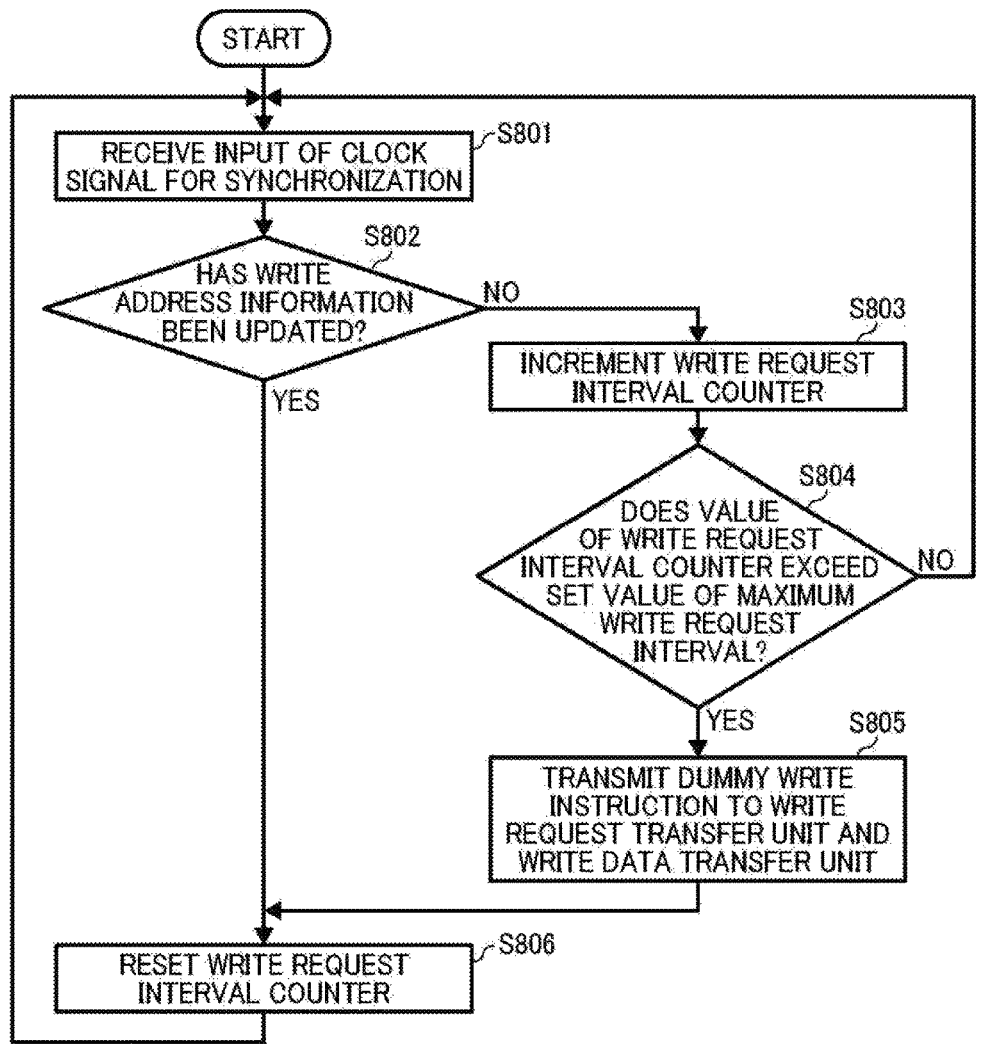
FIG. 8 is a flowchart illustrating an operation of a dummy write instruction unit in the standby unit.

FIG. 8 is a flowchart illustrating an operation of the dummy write instruction unit 407. As illustrated in FIG. 8, at step S801, the dummy write instruction unit 407 waits for input of a clock signal serving as a synchronization signal, and proceeds to step S802 upon receipt of the clock signal.

At step S802, the dummy write instruction unit 407 determines whether or not the write address information has been updated. If the write address information has been updated in accordance with the receipt of a new write request by the write request transfer unit 405 (YES at step S802), the dummy write instruction unit 407 proceeds to step S806. If the write address information has not been updated (NO at step S802), the dummy write instruction unit 407 proceeds to step S803.

At step S803, the dummy write instruction unit 407 increments a write request interval counter provided therein.

At step S804, the dummy write instruction unit 407 determines whether or not the value of the write request interval counter exceeds the value of a maximum write request interval previously set by the first CPU 20 provided in the signal transfer device 102 or an external CPU, for example. If the value of the write request interval counter exceeds the set value of the maximum write request interval (YES at step S804), the dummy write instruction unit 407 proceeds to step S805. If the value of the write request interval counter equals or falls below the set value of the maximum write request interval (NO at step S804), the dummy write instruction unit 407 returns to step S801.

If the value of the write request interval counter exceeds the set value of the maximum write request interval at step S804 (YES at step S804), the dummy write instruction unit 407 sends the dummy write instruction to the write request transfer unit 405 and the write data transfer unit 406 at step S805.

At step S806, the dummy write instruction unit 407 resets the write request interval counter provided therein and returns to step S801.

As described above, the signal transfer device 102 according to the second embodiment includes the configuration of the signal transfer device 102 according to the first embodiment and the dummy write instruction unit 407 that measures the transfer interval of the write request and issues the dummy write instruction if the transfer interval of the write request exceeds the predetermined time.

If there is a read request put on standby in the address comparison unit 401 when write requests are not generated continuously or when the write address registered in the write address FIFO memory 400 is not deleted with the transfer amount of the write data unchanged, the read request continues to be on standby, which may delay data reading or cause hang-up.

The signal transfer device 102 according to the second embodiment, however, performs dummy write at predetermined intervals with the write request interval counter serving as a timer. Accordingly, the maximum standby time of the read request put on standby in the address comparison unit 401 is determined, thereby reducing the read latency and preventing hang-up.

A third embodiment of this disclosure will now be described.

The third embodiment is similar in configuration to the second embodiment except for the configuration and operation of a standby unit 206C. The following description will therefore focus on differences of the third embodiment from the second embodiment.

Figure 9:
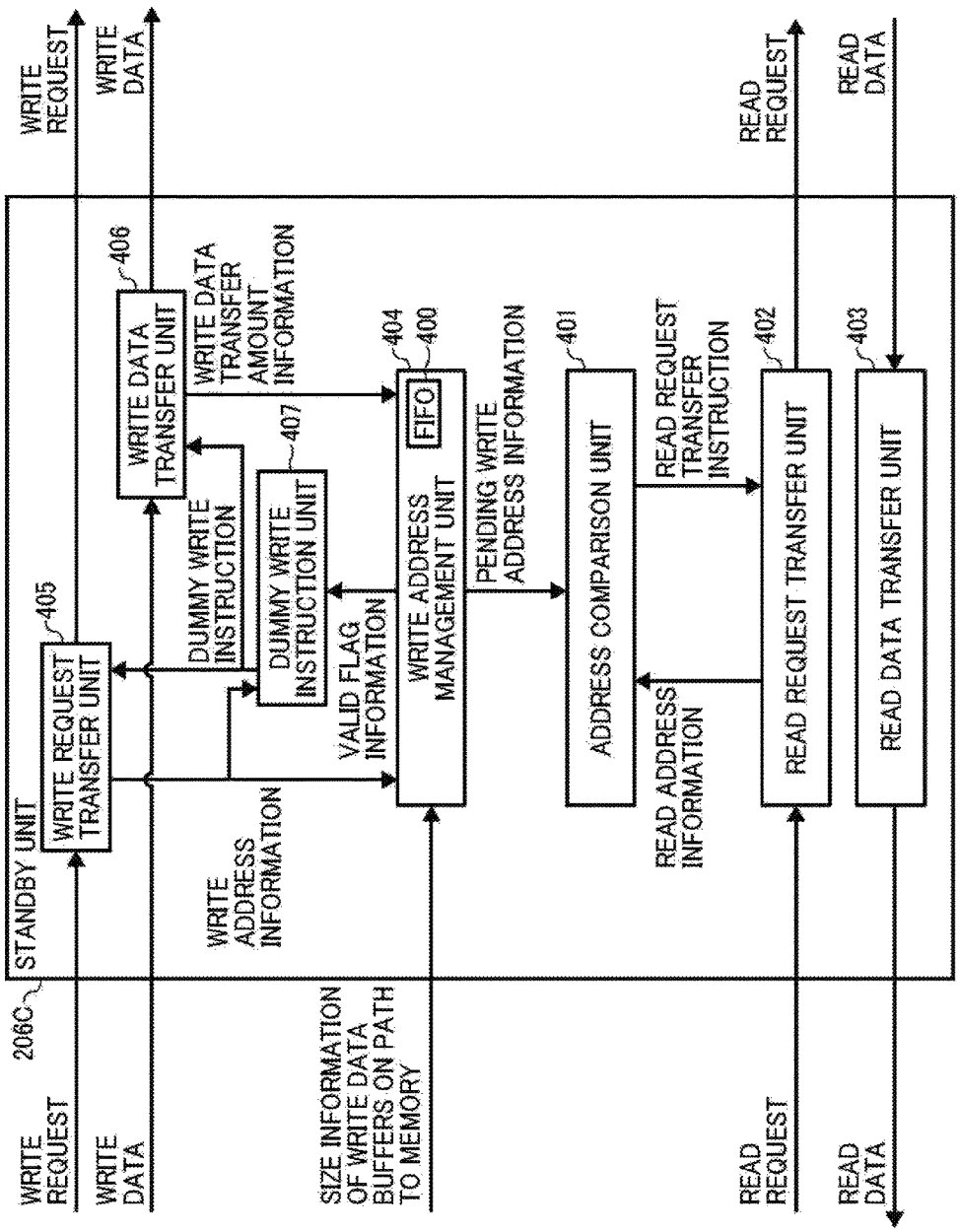
FIG. 9 is a diagram illustrating a configuration of a standby unit according to a third embodiment of this disclosure.

FIG. 9 is a diagram illustrating a configuration of the standby unit 206C according to the third embodiment. As illustrated in FIG. 9, the standby unit 206C according to the third embodiment is similar in configuration to the standby unit 206B according to the second embodiment except that the write address management unit 404 outputs validity flag information to the dummy write instruction unit 407 to notify if any of the validity flags registered in the write address FIFO memory 400 is set to 1.

The dummy write instruction unit 407 refers to the validity flag information, and issues the dummy write instruction if any of the validity flags is asserted. If all of the validity flags are set to 0, the dummy write instruction unit 407 does not issue the dummy write instruction to the write request transfer unit 405 and the write data transfer unit 406. The standby unit 206C performs an operation similar to that of the standby unit 206B according to the second embodiment illustrated in FIG. 8 except for blocking the dummy write instruction by referring to the valid flag information.

As described above, in the third embodiment, the dummy write instruction unit 407 refers to the validity flag information, and issues the dummy write instruction if the write address FIFO memory 400 stores any write address data with the validity flag set to 1.

The signal transfer device 102 according to the third embodiment, therefore, issues less dummy write packets than the signal transfer device 102 according to the second embodiment, thereby reducing data traffic and improving shared memory access performance of the information processing apparatus 1000.

A fourth embodiment of this disclosure will now be described.

The fourth embodiment is similar in configuration to the second embodiment except for the configuration and operation of a standby unit 206D. The following description will therefore focus on differences of the fourth embodiment from the second embodiment.

Figure 10:
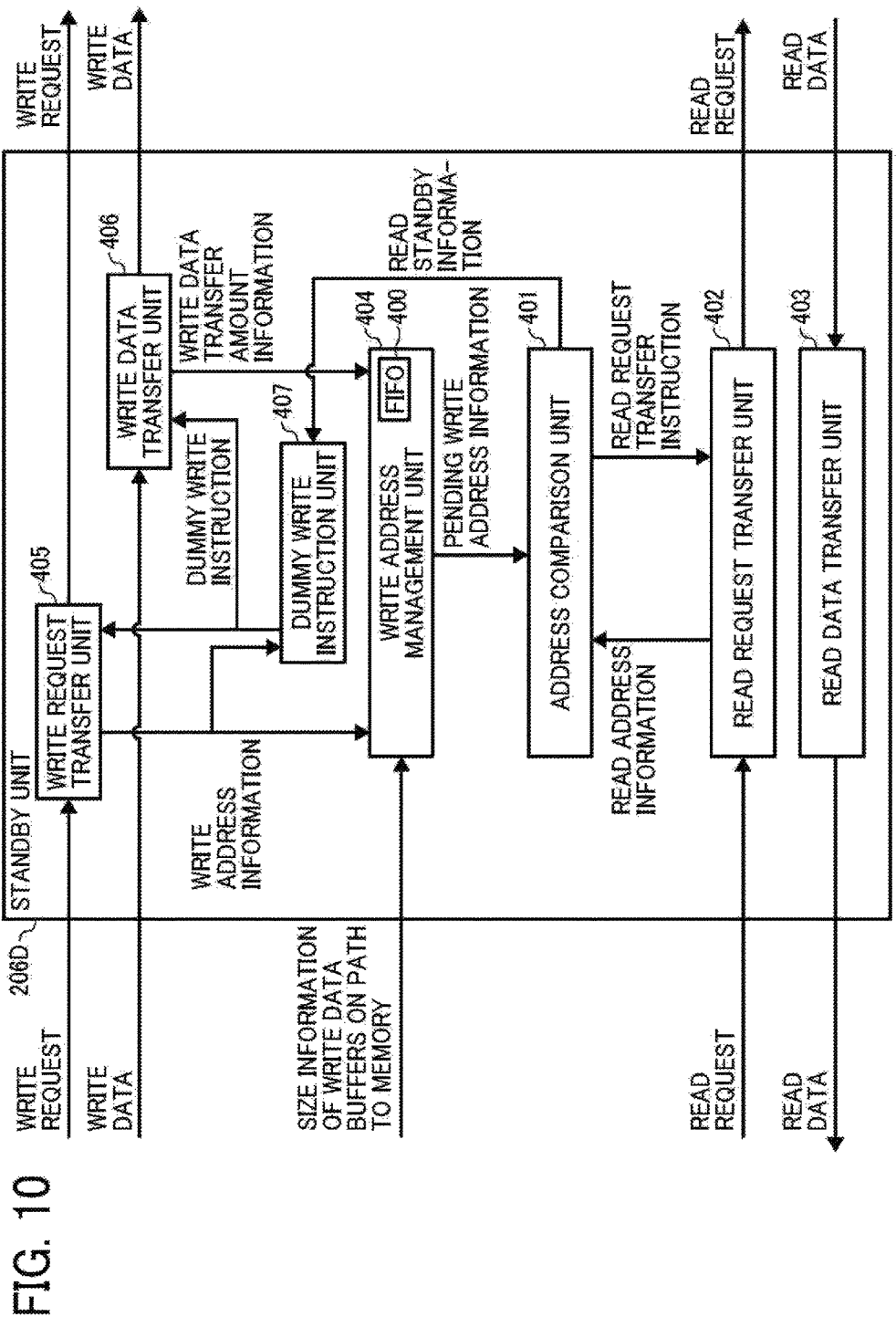
FIG. 10 is a diagram illustrating a configuration of a standby unit according to a fourth embodiment of this disclosure.

FIG. 10 is a diagram illustrating a configuration of the standby unit 206D according to the fourth embodiment. As illustrated in FIG. 10, the standby unit 206D according to the fourth embodiment is similar in configuration to the standby unit 206B according to the second embodiment except that the address comparison unit 401 sends the dummy write instruction unit 407 read standby information indicating the presence or absence of a read request put on standby.

The dummy write instruction unit 407 refers to the read standby information, and issues the dummy write instruction if there is a read request put on standby. If there is no read request put on standby, the dummy write instruction unit 407 does not issue the dummy write instruction to the write request transfer unit 405 and the write data transfer unit 406. The standby unit 206D performs an operation similar to that of the standby unit 206B according to the second embodiment illustrated in FIG. 8 except for blocking the dummy write instruction by referring to the read standby information.

As described above, in the signal transfer device 102 according to the fourth embodiment, the dummy write instruction unit 407 refers to the read standby information, and issues the dummy write instruction if there is a read request put on standby.

The signal transfer device 102 according to the fourth embodiment, therefore, issues less dummy write packets than the signal transfer device 102 according to the second embodiment, thereby reducing data traffic and improving shared memory access performance of the information processing apparatus 1000.

A fifth embodiment of this disclosure will now be described.

The fifth embodiment is similar in configuration to the first embodiment except for the configuration of the data stored in the write address FIFO memory 400 mounted in the write address management unit 404. The following description will therefore focus on differences of the fifth embodiment from the first embodiment.

FIGS. 11A and 11B are diagrams illustrating a configuration of the data stored in the write address FIFO memory 400 mounted in the write address management unit 404 according to the fifth embodiment. FIG. 11A illustrates data registered in the write address FIFO memory 400. FIG. 11B illustrates the size of the buffers on the write access path stored separately from the data of FIG. 11A.

As illustrated in FIG. 11A, the write address FIFO memory 400 stores the values of the validity flag, the write address, and the passed write data counter in a first-in, first-out fashion. The validity flag indicates whether or not the registered data is valid. The write address represents the write destination address. The passed write data counter indicates the amount of data passed through the standby unit 206. The write address FIFO memory 400 stores eight records (i.e., data items), for example.

To improve the transfer efficiency, a system that transfers large-sized data such as image data typically transfers multibyte data in one packet by using burst length information of commands and byte enable information of a data bus. In the foregoing first embodiment, the write address and the corresponding write data size are stored together in the write address FIFO memory 400 for the comparison with the read address.

The fifth embodiment employs a method of not accumulating write data sizes for the respective write requests in the write address FIFO memory 400 to reduce the physical silicon size of the signal transfer device 102.

With no write data sizes accumulated, the data in the write address FIFO memory 400 is formatted as illustrated in FIGS. 11A and 11B.

The write data size in this case is set to a fixed value corresponding to the maximum size of write packets passing through the standby unit 206, and is not required to be notified to the address comparison unit 401 or stored in the write address FIFO memory 400.

The address comparison unit 401 compares the read address with the write address regardless of whether or not the write address has actually been accessed. Therefore, the read request may be put on standby unnecessarily. The reduction in silicon size, however, results in a reduction in cost, contributing to the optimization of the information processing apparatus 1000.

As described above, the signal transfer device 102 according to the fifth embodiment does not accumulate write data sizes for the respective write requests in the write address FIFO memory 400. With no need to store write data sizes in the write address FIFO memory 400, therefore, the necessary size of the write address FIFO memory 400 is reduced, leading to a reduction in device cost.

A sixth embodiment of this disclosure will now be described.

The sixth embodiment is similar in configuration to the first embodiment except for the configuration of the data stored in the write address FIFO memory 400 mounted in the write address management unit 404. The following description will therefore focus on differences of the sixth embodiment from the first embodiment.

FIGS. 12A and 12B are diagrams illustrating a configuration of the data stored in the write address FIFO memory 400 mounted in the write address management unit 404 according to the sixth embodiment. FIG. 12A illustrates data registered in the write address FIFO memory 400. FIG. 12B illustrates the size of the buffers on the write access path stored separately from the data of FIG. 12A.

As illustrated in FIG. 12A, the write address FIFO memory 400 stores the validity flag and the write address in a first-in, first-out fashion. The validity flag indicates whether or not the registered data is valid. The write address represents the write destination address. The write address FIFO memory 400 stores eight records (i.e., data items), for example.

The sixth embodiment is similar to the fifth embodiment in using a fixed length as the write data size of the write request. In the sixth embodiment, each write address has a fixed write data size. Thus, data management is performed with the number of write addresses being accumulated in place of the passed write data counter.

Specifically, the order of registration of data in the write address FIFO memory 400 is managed, and the value obtained by multiplying the number of write addresses with the validity flag set to 1 by the fixed value of the write data size is managed as passed write data counter information. This configuration obviates the passed write data counter and the write data transfer amount information in FIGS. 3, 7, 9, and 10 transmitted to the write address management unit 404 from the write data transfer unit 406.

In the sixth embodiment, the dummy writes are also registered and managed in the write address FIFO memory 400.

In the sixth embodiment, the address comparison unit 401 compares the read address with the write address regardless of whether or not the write address has actually been accessed, and thus the read request may be put on standby unnecessarily, as in the fifth embodiment. The reduction in silicon size, however, results in a reduction in cost, contributing to the optimization of the information processing apparatus 1000.

As described above, the signal transfer device 102 according to the sixth embodiment does not accumulate write data sizes and passed write data counter values for the respective write requests in the write address FIFO memory 400. With no need to store write data sizes and passed write data counter values in the write address FIFO memory 400, therefore, the necessary size of the write address FIFO memory 400 is reduced, leading to a further reduction in device cost.

A seventh embodiment of this disclosure will now be described.

The seventh embodiment is similar in configuration to the second embodiment except for the configuration and operation of a standby unit 206E. The following description will therefore focus on differences of the seventh embodiment from the second embodiment.

Figure 13:
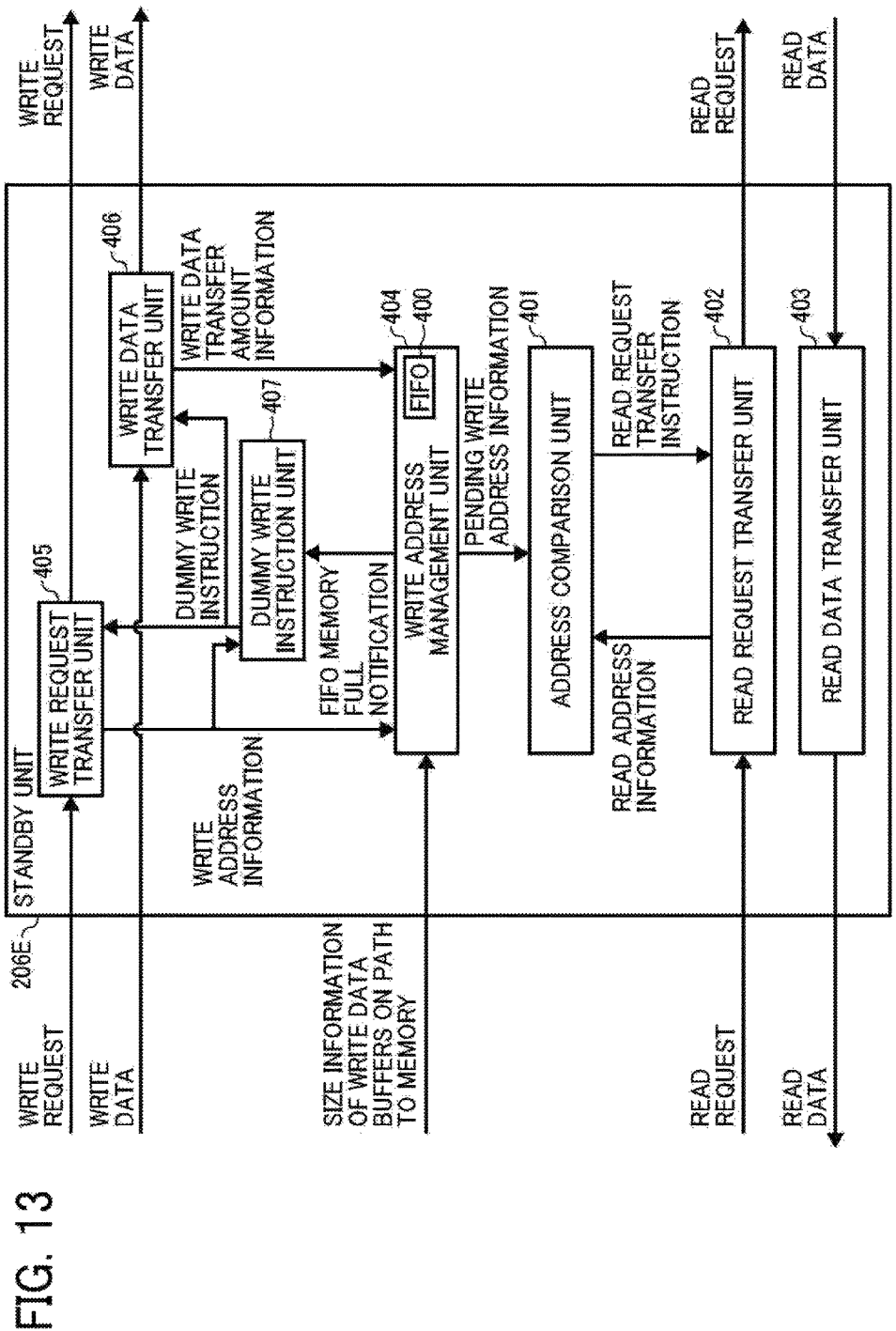
FIG. 13 is a diagram illustrating a configuration of a standby unit according to a seventh embodiment of this disclosure.

FIG. 13 is a diagram illustrating a configuration of the standby unit 206E according to the seventh embodiment. As illustrated in FIG. 13, the standby unit 206E according to the seventh embodiment is similar in configuration to the standby unit 206B according to the second embodiment except that the write address management unit 404 outputs FIFO memory full notification to the dummy write instruction unit 407 to notify that the write address FIFO memory 400 has been filled to capacity.

The dummy write instruction unit 407 issues the dummy write instruction if the write address FIFO memory 400 is filled with write addresses registered therein and is unable to receive any further write addresses.

The signal transfer device 102 according to the seventh embodiment is different from the signal transfer device 102 according to the second embodiment in the following operation.

If the write address FIFO memory 400 is filled to capacity, the write address management unit 404 transmits the FIFO memory full notification to the dummy write instruction unit 407. In response to the FIFO memory full notification, the dummy write instruction unit 407 transmits the dummy write instruction to the write request transfer unit 405 and the write data transfer unit 406. In response to the dummy write instruction, the write request transfer unit 405 and the write data transfer unit 406 stop receiving write requests from the arbiter 204 and issue dummy write access.

If the write requests in the write access do not always have a constant size, the number of necessary stages of the write address FIFO memory 400 correspond to up to the size of the write data buffers on the path multiplied by the maximum burst size.

For example, if all write requests are generated in units of one byte in a system having a maximum burst size of 512 bytes, the necessary stages of the write address FIFO memory 400 correspond to 512 times the size of the write data buffers on the path. In a system that normally transfers write requests in units of 512 bytes, however, physically mounting a write address FIFO memory of a size 512 times the size of the write data buffers on the path results in an increase in cost. With the configuration of the seventh embodiment addressing occasionally generated short packets, it is unnecessary to fully mount a write address FIFO memory of the above-described size in the system, thereby reducing cost.

As described above, in the signal transfer device 102 according to the seventh embodiment, the dummy write instruction unit 407 issues the dummy write instruction if the write address FIFO memory 400 is filled with write addresses registered therein.

With the present configuration addressing the occasionally generated short packets, therefore, it is unnecessary to fully mount a write address FIFO memory of the above-described size in the signal transfer device 102 according to the seventh embodiment, thereby reducing cost.

The write address management unit 404 may acquire the write data transfer amount based on the burst length information of the write packet added to the write request.

Further, the write address management unit 404 may count the write data transfer amount in data enable bits in synchronization with the write data.

Moreover, the write address management unit 404 may manage the write addresses by comparing the number of write requests passed through the standby unit 206 with the buffer size for write requests present on the path from the standby unit 206 to the data path having no function of maintaining the temporal order of the write request and the read request, without using the data transfer amount.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A signal transfer device comprising:
an interface to transfer data from the signal transfer device to a shared memory via a memory control device that controls access to the shared memory, wherein the interface operates with a posted write data protocol, wherein the memory control device is operable to change an order of read and write requests received from the signal transfer device, and wherein a data path that traverses from the signal transfer device and through the memory control device includes buffers to temporarily store the read and write requests issued to the shared memory; and
a read and write circuit to store a total size of the buffers on the data path, to detect a write request issued by the signal transfer device to a write address in the shared memory, to detect a read request from the signal transfer device for the write address in the shared memory, to put the read request on standby in the signal transfer device in response to detecting that the read request and the write request are both intended for the write address, and to release the read request from the standby to issue the read request from the signal transfer device to the write address in the shared memory in response to determining that an amount of write data issued from the signal transfer device to the shared memory exceeds the total size of the buffers on the data path.

2. The signal transfer device of claim 1, wherein the read and write circuit measures a transfer interval of the write request, determines if the transfer interval of the write request exceeds a predetermined time, and issues a dummy write instruction based on a determination that the transfer interval of the write request exceeds the predetermined time.

3. The signal transfer device of claim 2, wherein the read and write circuit includes a write address first-in, first-out memory to store, in a first-in, first-out fashion, the write address acquired from the write request and a validity flag for the write address indicating that data is being written to the shared memory, and
wherein the read and write circuit further determines if the validity flag for the write address stored in the write address first-in, first-out memory is valid, and issues the dummy write instruction based on a determination that the validity flag for the write address stored in the write address first-in, first-out memory is valid.

4. The signal transfer device of claim 2, wherein the read and write circuit further determines if the read request is put on standby, and issues the dummy write instruction based on a determination that the read request is put on standby.

5. The signal transfer device of claim 3, wherein the read and write circuit further determines if the write address first-in, first-out memory is filled with the write address, and issues the dummy write instruction based on a determination that the write address first-in, first-out memory is filled with the write address.

6. An information processing apparatus comprising:
a memory control device to control access to a shared memory; and
the signal transfer device of claim 1.

7. A signal transfer method comprising:
transferring data from a signal transfer device to a memory control device via an interface having a posted write data protocol, the memory control device controlling access to a shared memory and operable to change an order of read and write requests received from the signal transfer device, wherein a data path that traverses from the signal transfer device and through the memory control device includes buffers to temporarily store the read and write requests issued to the shared memory;
storing a total size of the buffers on the data path;
issuing, with the signal transfer device, a write request for writing data to a write address in the shared memory;
detecting, from the signal transfer device, a read request for reading data from the write address in the shared memory;
putting the read request on standby in the signal transfer device in response to detecting that the read request and the write request are both intended for the write address; and
releasing the read request from the standby to issue the read request from the signal transfer device to the write address in the shared memory in response to determining that an amount of write data issued by the signal transfer device to the shared memory exceeds the total size of the buffers on the data path.

8. The signal transfer method of claim 7, further comprising:
measuring a transfer interval of the write request;
determining if the transfer interval of the write request exceeds a predetermined time; and
issuing a dummy write instruction based on a determination that the transfer interval of the write request exceeds the predetermined time.

9. The signal transfer method of claim 8, further comprising:
storing the write address and a validity flag for the write address in a write address first-in, first-out memory in a first-in, first-out fashion, the validity flag indicating that data is being written to the shared memory;
determining if the validity flag for the write address stored in the write address first-in, first-out memory is valid; and
issuing the dummy write instruction based on a determination that the validity flag for the write address stored in the write address first-in, first-out memory is valid.

10. The signal transfer method of claim 8, further comprising:
determining if the read request is put on standby; and
issuing the dummy write instruction based on a determination that the read request is put on standby.

11. The signal transfer method of claim 9, further comprising:
determining if the write address first-in, first-out memory is filled with the write address; and
issuing the dummy write instruction based on a determination that the write address first-in, first-out memory is filled with the stored write address.

12. A non-transitory recording medium storing a program for causing a computer to execute a signal transfer method comprising:
- transferring data from a signal transfer device to a memory control device via an interface having a posted write data protocol, the memory control device controlling access to a shared memory and operable to change an order of read and write requests received from the signal transfer device due, wherein a data path that traverses from the signal transfer device and through the memory control device includes buffers to temporarily store the read and write requests issued to the shared memory;
- storing a total size of the buffers on the data path;
- issuing, with the signal transfer device, a write request for writing data to a write address in the shared memory;
- detecting, from the signal transfer device, a read request for reading data from the write address in the shared memory;
- putting the read request on standby in the signal transfer device in response to detecting that the read request and the write request are both intended for the write address; and
- releasing the read request from the standby to issue the read request from the signal transfer device to the write address in the shared memory in response to determining that an amount of write data issued by the signal transfer device to the shared memory exceeds the total size of the buffers on the data path.

* * * * *